United States Patent

[11] 3,631,874

[72] Inventor Donald L. Rexford
 Schenectady, N.Y.
[21] Appl. No. 17,124
[22] Filed Mar. 6, 1970
[45] Patented Jan. 4, 1972
[73] Assignee General Electric Company

[54] FLUIDIC OVERSPEED SENSOR FOR A POWER TURBINE
 4 Claims, 1 Drawing Fig.

[52] U.S. Cl. .................................................. 137/81.5
[51] Int. Cl. .................................................. F15c 1/12
[50] Field of Search ..................................... 137/81.5

[56] References Cited
UNITED STATES PATENTS

| | | | |
|---|---|---|---|
| 3,285,264 | 11/1966 | Boothe .................. | 137/81.5 |
| 3,292,648 | 12/1966 | Colston ................. | 137/81.5 X |
| 3,430,895 | 3/1969 | Campagnuolo ........ | 137/81.5 X |
| 3,458,129 | 7/1969 | Woodson .............. | 137/81.5 X |
| 3,463,176 | 8/1969 | Lazar .................... | 137/81.5 X |
| 3,486,518 | 12/1969 | Howland ............... | 137/81.5 |
| 3,532,081 | 10/1970 | Middleton ............. | 137/81.5 X |
| 3,566,689 | 3/1971 | Ringwall et al. ...... | 137/81.5 |

*Primary Examiner*—Samuel Scott
*Attorneys*—Derek P. Lawrence, Frank L. Neuhauser, Oscar B. Waddell, Joseph B. Forman, Thomas J. Bird, Jr. and Lee H. Sachs

ABSTRACT: A fluidic sensor having two parallel frequency-to-analog circuits whose output is summed to provide an error signal is disclosed.

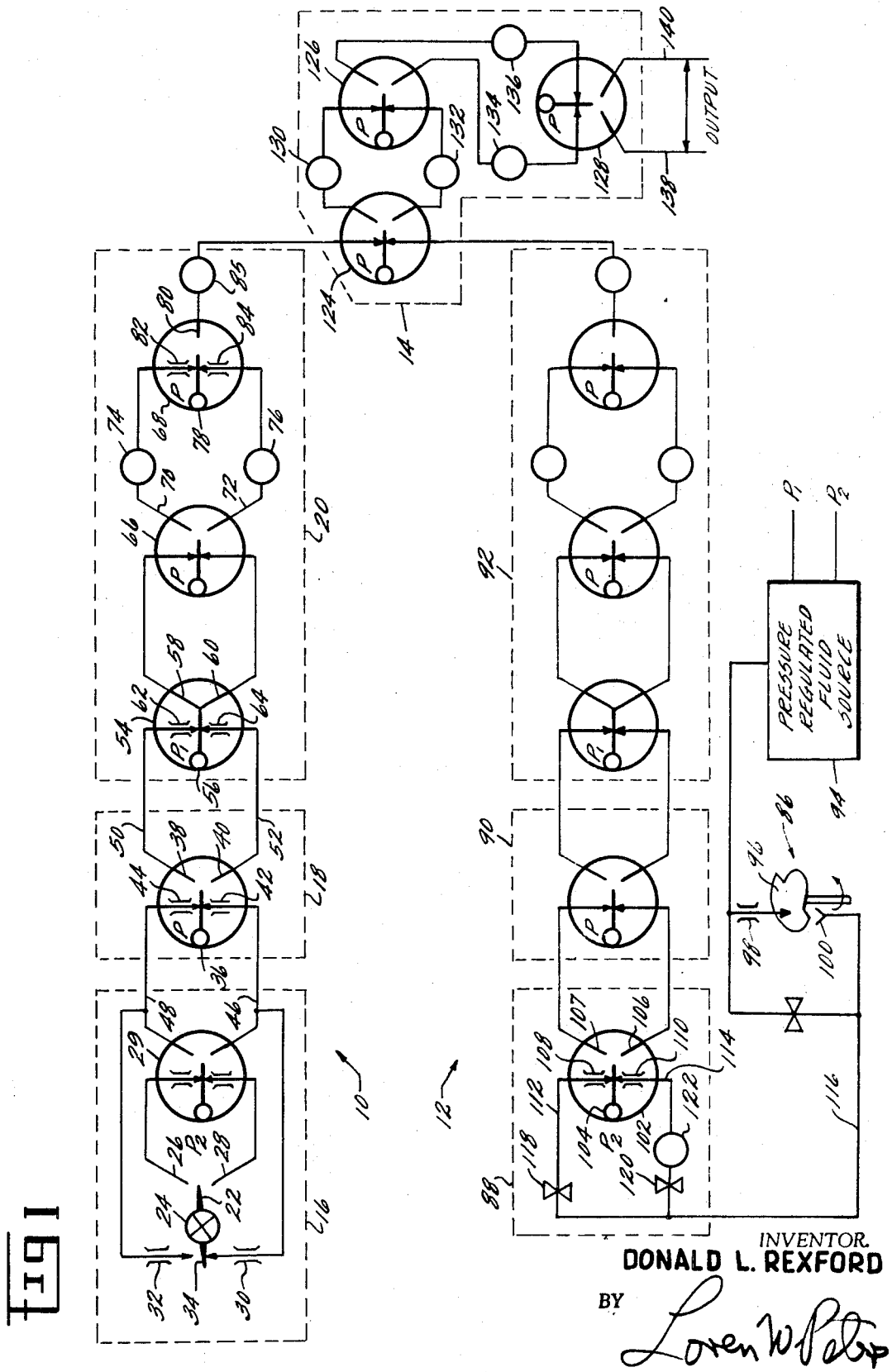

FLUIDIC OVERSPEED SENSOR FOR A POWER TURBINE

BACKGROUND OF THE INVENTION

This invention relates to fluidic controls and more particularly to control circuits adapted to the requirements of gas turbine engines.

Gas turbine engine control requirements include protection of the engine against overspeed of the turbine. Additionally, many thrust or power control systems for gas turbine engines include speed control loops. Several mechanization possibilities exist for engine rotor speed control; however, fluidics possess certain advantages for several applications.

An advantageous means for sensing shaft or rotor speed is to use a "chopper" wherein a device on the shaft periodically interrupts a flow of fluid and creates a pressure oscillation in the fluid line, the frequency of oscillation being a function of shaft speed. To be used in a closed loop speed control system, the thusly derived frequency signal must be compared to a reference, either a frequency reference or an analog reference after the speed frequency signal has been converted to an analog pressure signal representative of speed. If the latter comparison method is used, an accurate frequency-to-analog converter having adequate pressure output for actuating a control device is required. Additionally, the analog reference must be accurately representative of the desired speed setting to minimize inaccuracies in the speed error signal.

One characteristic of fluid devices that can be disadvantageous if not properly compensated for is temperature sensitivity over a wide environmental temperature range. Just such a range occurs in the usual gas turbine engine application, so that speed reference and speed signal channels of a fluidic control must include compensation for temperature sensitivity of the various elements.

Accordingly, it is an object of this invention to provide a fluidic speed control whose output is relatively insensitive to environmental temperature. A further object of the invention is to provide an improved frequency-to-analog conversion fluidic circuit.

BRIEF SUMMARY OF THE INVENTION

In accordance with the objects of the invention, the invention comprises a two-channel fluidic circuit. The reference channel includes a reference frequency oscillator and frequency-to-analog conversion means, and the speed channel comprises a chopper and decoupler to provide a frequency signal which is processed by a frequency-to-analog converter identical with that first mentioned.

BRIEF DESCRIPTION OF THE DRAWINGS

While the specification concludes with claims particularly pointing out and distinctly claiming the invention, it is more readily understandable by reference to the discussion below and the accompanying drawings in which:

FIG. 1 is a schematic view of a fluidic speed governor.

DESCRIPTION OF THE PREFERRED EMBODIMENT

FIG. 1 illustrates a speed control circuit which comprises a reference channel 10, a sensing channel 12, and a signal summing circuit 14.

Reference channel 10 comprises a reference oscillator 16, preamplifier 18, and frequency-to-analog converter 20. Oscillator 16 can have any one of several constructions adapted to provide a sinusoidal output. One such construction having a high accuracy is that described in the application for letters patent Ser. No. 804,924, filed Mar. 6, 1969, now abandoned in the name of Carl G. Ringwall and assigned to the assignee of this application. The referenced construction is shown schematically in FIG. 1 and comprises a jet pipe 22 suspended on a torsional pivot 24. The output of jet pipe 22 is alternately directed by virtue of oscillation of jet pipe 22 on pivot 24 to receivers 26, 28. The output from receivers 26, 28 is amplified by proportional amplifier 29 and fed back through nozzles 30, 32 respectively to impinge upon plate 34 and drive the jet pipe 22. Jet pipe 22 will thus oscillate at the resonant frequency of the spring mass system to provide a sinusoidal output from amplifier 29.

Preamplifier 18 is a proportional fluidic device of known construction having a power nozzle 36, a pair of receivers 38, 40 symmetrically disposed downstream of nozzle 36 with respect to the axis thereof, and a pair of control ports 42, 44 on either side of the axis of nozzle 36. The oscillating signal output from amplifier 29 (which is of similar construction) through passageways or conduit means 46, 48 thus causes deflection of a power stream issuing from nozzle 36 and causes sinusoidal oscillation of the said power stream between receivers 38, 40 to provide an amplified output from preamplifier 18.

The output from preamplifier 18 is directed to the first stage 54 of frequency-to-analog converter 20 by a pair of passageways or conduit means 50, 52. The first stage 54 is a flip-flop of known construction operating on the wall attachment principle and having a power nozzle 56, receivers 58, 60 downstream therefrom, and a pair of control ports 62, 64. Operation of device 54 is characterized by a square wave output in response to the sinusoidal input from preamplifier 18, the output frequency being equal to the input frequency, and the output amplitude being independent of the pressure in preamplifier 18.

The output of device 54 is amplified by a proportional amplifier 66 (having a construction similar to that of amplifiers 29 and 18) which is designed to saturate in response to the output from device 54 and provide a square wave output having a frequency equal to input frequency and an amplitude independent of input amplitude.

The output side of amplifier 66 is connected to rectifier 68 by passageways 70, 72 which include equal capacitive volumes 74, 76 respectively. Rectifier 68 is a device constructed in accordance with known fluid amplifier fabrication techniques, having a power nozzle 78, a single receiver 80 downstream from the power nozzle 78 and aligned with the axis thereof, and a pair of control ports 82, 84 oppositely disposed with respect to the axis of power nozzle 78. Its output is characterized by being at a maximum with a zero signal differential between ports 82, 84 and a minimum with a saturation signal differential between 82, 84. In response to an oscillating input, device 68 will have an output whose magnitude is dependent upon the time required to sweep a jet issuing from power nozzle 78 past receiver 80, which is related to the time-amplitude relationship of the input signal. In the case of a square wave input, the sweep time will be short and hence the output will be low because the square wave input is almost instantaneously at full amplitude.

To increase the output magnitude of device 68, capacitors 74, 76 included on the input side thereof modify the input signal be decreasing its rise rate and allowing the power jet from nozzle 78 to pass more slowly across receiver 80.

It should be noted that capacitors 74, 76 are sized to provide a delay in the rectifier 68 input rise rate which is less than one-half the period of oscillation in the frequency range of interest. Otherwise, the delay would preclude reaching full input amplitude during one-half cycle, which would result in a frequency dependent output error. "Operation of the above-described frequency-to-analog converter 20 is more fully described in U.S. Pat. No. 3,409,032, issued Nov. 5, 1968 to Willis A. Boothe et al. and assigned to the assignee of the present invention."

The output from rectifier 68 is averaged by a filtering capacitor 85 to provide a DC signal level proportional to the frequency of oscillator 16.

Sensing channel 12 comprises a "chopper" 96, decoupler 88, preamplifier 90, and frequency-to-analog converter 92. Preamplifier 90 and converter 92 are identical to components 18 and 20, and to effect one of the objects of the invention, are mounted in the same heat sink as components 18 and 20. In addition, the active elements of each of channels 10 and 12 are supplied with working fluid from the same fluid source 94. Thus, any environmental temperature effects will act equally on both channels and be nulled out in the final summation of the channel outputs.

Chopper 86 comprises a cam or plate 96 attached to the shaft whose speed is to be measured and located to interrupt the flow of fluid between a nozzle 98 and receiver 100, nozzle 98 being supplied from fluid source 94. An oscillating output from the chopper 86 is then processed by decoupler 88 to eliminate the effect of the DC component of the speed signal. Decoupler 88 comprises a proportional fluid amplifier 102 having a power nozzle 104, a pair of receivers 106, and a pair of control ports 108, 110 adapted to issue control streams which interact with a power stream issued from power nozzle 104. A pair of conduits 112, 114 are connected to control ports 108, 110 respectively and are both connected to receiver 100 of chopper 86 by a conduit or passageway 116. Conduit 112 includes a resistor 118, and conduit 114 includes a resistor 120 and capacitor 122. In operation, the oscillating signal from chopper 86, which comprises an oscillating signal superimposed on a DC pressure level, enters each of conduits 112, 114. In conduit 114, the oscillating component of the signal is filtered out by the combination of resistor 120 and capacitor 122 so that a DC pressure signal appears at control port 110. Both the oscillating and DC components pass through conduit 112 to control port 108, the DC component tending to null the DC signal in control port 110 and the oscillating component acting to sweep a jet issuing from power nozzle 104 between receivers 106, 108, thereby providing an oscillatory output from decoupler 88.

The output from decoupler 88 is preamplified in preamplifier 90 and converted to an analog signal by frequency-to-analog converter in the same manner as in reference channel 10. The analog signals from channels 10 and 12 are then compared by proportional amplifier 124, whose output is amplified by amplifiers 126, 128. Capacitors 130, 132, 134, 136 are included in the signal lines of amplifiers 126, 128 to further filter the signal from amplifier 124. The output pressure differential signal between output lines 138, 140 represents the difference between desired speed and actual shaft speed, i.e., the speed error signal.

Having above described a preferred embodiment of the invention, though not exhaustive of all possible equivalents, what is desired to be secured by letters patent is claimed below.

What is claimed is:

1. A fluidic speed sensor comprising:
   a reference channel which comprises a frequency reference and a first frequency-to-analog converter connected to the output of said frequency reference;
   a sensing channel comprising means for generating a signal whose frequency is proportional to a shaft speed, and a second frequency-to-analog converter connected to the output of said speed signal generating means, and
   summing means connected to the output means of both channels to sum the analog outputs therefrom;
   said first frequency-to-analog converter being identical to said second frequency to analog converter, the components of each said channel other than said frequency source and said speed signal generating means being subject to a common heat sink, and all active fluidic components being supplied from a common source of pressurized fluid.

2. The speed sensor recited in claim 1 wherein each said frequency-to-analog converter comprises,
   fluidic square wave generating means for converting an oscillating input signal into a square wave whose frequency is equal to the input frequency and whose amplitude is independent of the input signal amplitude, said square wave generating means having a push-pull output means comprising two output receivers.
   a fluidic rectifier having a single output receiver and input signal means adapted to receive a push-pull input signal, said input means including a pair of control ports;
   two passageways, each passageway connecting one of said output receivers to one of said control ports, said passageways including capacitive elements having equal capacitance; and
   a filtering capacitor connected to the output of said fluidic rectifier.

3. The speed sensor recited in claim 2 wherein said square wave generating means comprises a fluidic flip-flop adapted to receive a differential pressure input signal and whose output means is adapted to provide a differential pressure output signal.

4. The speed sensor recited in claim 3 wherein said capacitive elements are each sized to provide a time delay which is less than one-half the period of oscillation of the maximum signal frequency to be converted.

* * * * *